United States Patent [19]
Archibald et al.

[11] Patent Number: 5,479,650
[45] Date of Patent: Dec. 26, 1995

[54] METHOD AND APPARATUS FOR SWITCHING COMMUNICATIONS FROM A SECONDARY CHANNEL TO A PRIMARY CHANNEL

[75] Inventors: James L. Archibald, Clearwater; Mahendra Patel, Brandon, both of Fla.

[73] Assignee: AT&T Corp., Murray Hill, N.J.

[21] Appl. No.: 996,434

[22] Filed: Dec. 24, 1992

[51] Int. Cl.⁶ .................................................. G06F 11/00
[52] U.S. Cl. .................................................. 395/575
[58] Field of Search .......................... 371/8.1, 8.2, 11.2; 370/16; 395/575

[56] References Cited

U.S. PATENT DOCUMENTS

| | | | |
|---|---|---|---|
| 4,385,384 | 5/1983 | Rosbury et al. | 371/22.1 |
| 5,138,609 | 8/1992 | Hashimoto | 370/16 |
| 5,191,583 | 3/1993 | Pearson et al. | 371/32 |
| 5,210,740 | 5/1993 | Anzai et al. | 371/11.2 |

*Primary Examiner*—Hoa T. Nguyen
*Attorney, Agent, or Firm*—Joseph J. Opalach

[57] ABSTRACT

Some data communications networks employ the use of both a leased line and a dial-up line between two modems. Typically, the dial-up line provides a backup capability when the leased line causes a degradation in the signal quality of the data signal. This degradation of the signal quality of the data signal is detected by one of the two modems, which then automatically establishes a data connection over the dial-up line. However, it is preferable to switch back to the leased line as soon as possible since the leased line usually costs less than the dial-up line. Therefore, in order to test the leased line, the entire data signal is simultaneously transmitted on both the dial-up line and the leased line. The use of the existing data signal to test the leased line's effect on signal quality allows the modem to perform a more complete analysis of the returned data signal so that a premature transition back to the leased line does not occur.

11 Claims, 3 Drawing Sheets

METHOD AND APPARATUS FOR SWITCHING COMMUNICATIONS FROM A SECONDARY CHANNEL TO A PRIMARY CHANNEL

BACKGROUND OF THE INVENTION

The present invention relates to the use of data communications equipment (DCE) in a leased line environment.

Some data communications networks have connections to both a leased line and a dial-up line between data communications equipment. Typically, the leased line is the primary communications channel for communicating information between the two modems while the dial-up line, i.e., the secondary communications channel, provides a backup capability when communications over the leased line is interrupted. Usually, this interruption is not a complete break in the data connection between the two modems over the leased line but rather is represented by a degradation in the signal quality of the data signal communicated over the leased line which results in an increase in the error rate. When this increase in error rate is detected by one of the two modems, it terminates data communications over the primary channel and automatically establishes a data connection to the other modem over the secondary channel, i.e., the dial-up line, through the public switched telephone network (PSTN). However, it is preferable to switch back to the leased line as soon as possible since the leased line usually costs less than the dial-up line. Currently, there are a number of procedures available for use in a modem for testing the leased line's effect on a signal so that the modem may estimate the line quality of the leased line and, if possible, disconnect the dial-up connection and switch back to using the leased line.

In one method, the modem interrupts the dial-up connection for a period of time and attempts to perform a modem train over the leased line with the other modem. If modem training is unsuccessful then the modem assumes that the leased line channel is still impaired and resumes data communications over the dial-up connection. However, when modem training is successful, communications is restored over the leased line, and the dial-up connection is dropped.

In another method, the modem creates a test signal and transmits this signal on the leased line while transmitting the data signal over the dial-up connection. In one embodiment of this method the modem creates the test signal using a slow speed modulation scheme, e.g., CCIT V.21, over the leased path while still sending the data signal using a high speed modulation scheme, e.g., CCITT V.32bis, over the dial-up connection. In this embodiment, the modem does not switch back to the leased line until the number of errors detected by the modem on the received test signal is less than a predetermined amount. Another embodiment of this method is illustrated by U.S. Pat. No. 5,138,609 issued Aug. 11, 1992 to Hashimoto. In this patent, the test signal created by the modem is a single frequency signal, i.e., a tone, that is transmitted over the leased line. In this embodiment the modem does not switch back to the lease line until the modem successfully detects the single tone.

Unfortunately, the above-mentioned prior art, while providing methods to test the leased line, are not complete answers to the problem. For example, the first method interrupts the data communications over the dial-up connection while testing the leased line, and the second method adds the complexity of creating a test signal in the modem, which does not provide for more sophisticated analysis of the primary channel.

SUMMARY OF THE INVENTION

In accordance with the principles of the invention, a data communications equipment evaluates the primary channel without either interrupting the data communications over the secondary channel or creating a test signal. In particular, the data communications equipment evaluates the primary channel by using an existing data signal. When the received error rate of the data signal from the primary channel goes below a predetermined number, the data communications equipment restores communications over the primary channel.

In an embodiment of the invention, a near-end modem establishes a data connection over a leased line to a far-end modem. When the leased line deteriorates, the near-end modem switches communications to the far-end modem so that the near-end modem's data signal is now transmitted through the PSTN. Notwithstanding the fact that communications with the far-end modem is occurring through the PSTN, the near-end modem still periodically sends its data signal over the leased line. The far-end modem, upon receipt of the near-end modem's data signal over the leased line, then sends its data signal to the near-end modem over the leased line. The near-end modem monitors the line quality, or condition of the leased line, by evaluating the leased line channel's effect on the far-end modem's data signal. Under control of such monitoring, the near-end modem switches back to using the leased line when the error rate of the far-end modem's data signal over the leased line is below a selected threshold. When the near-end modem restores communications over the leased line, the dial-up connection is terminated. This approach allows the near-end modem to test the signal quality of the data signal on the leased line without interrupting the data communications over the dial-up line and adds no complexity to the modem since a test signal is not created.

DETAILED DESCRIPTION

Figure 1:
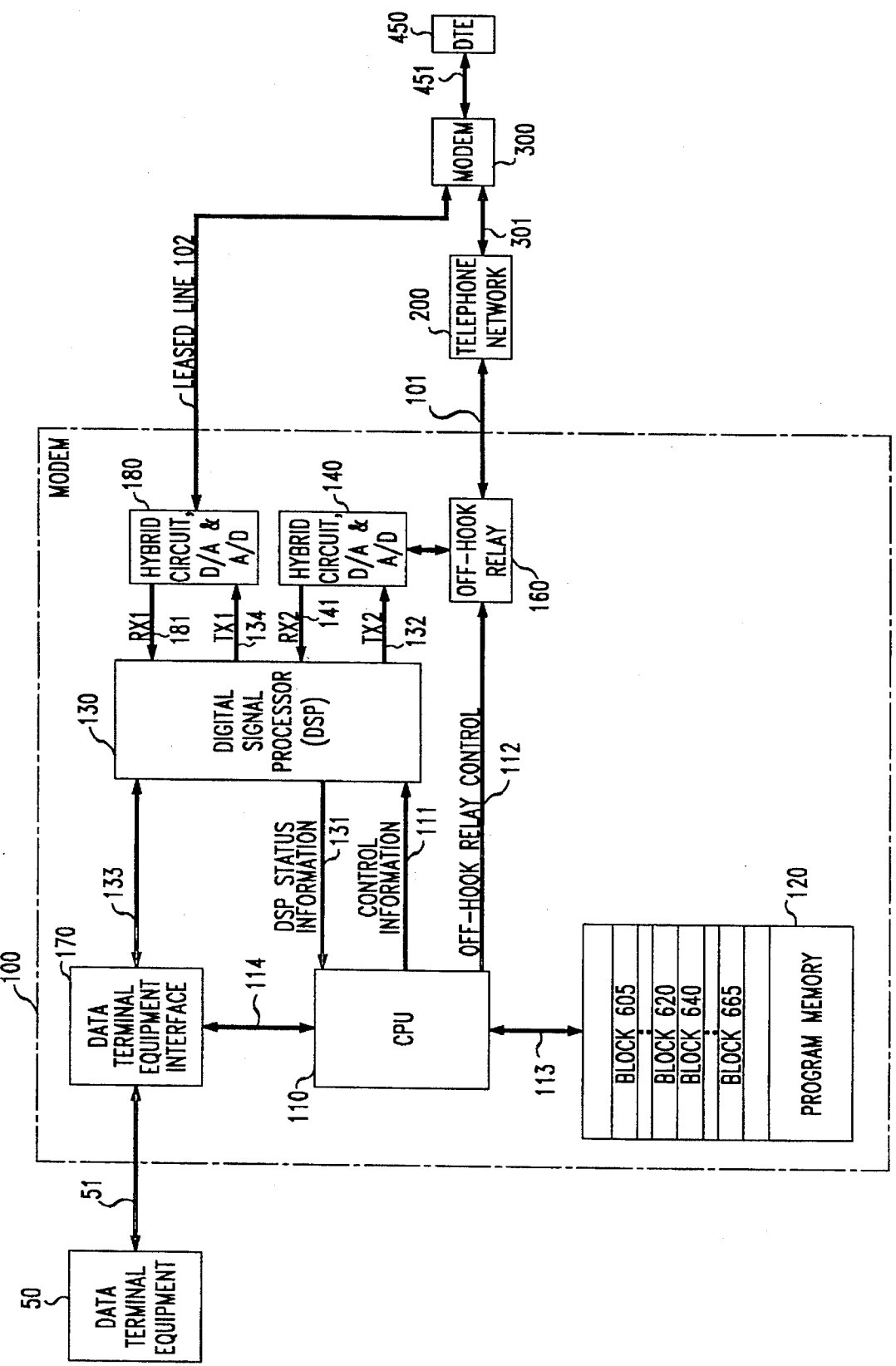
FIG. 1 is a block diagram of data communications system comprising a modem that embodies the principles of the invention.

FIG. 1 shows a modem that embodies the inventive concepts of this invention. The individual components of this modem are well-known and are not described in detail. As shown, modem 100 is connected to modem 300 over leased line 102, which is the primary communications channel. In addition, modem 100 is connected to telephone network 200, via telephone line 101. Similarly, modem 300 is connected to telephone network 200 via telephone line 301. The PSTN, or secondary communications channel, is represented by telephone lines 101 and 301, and telephone network 200. Telephone lines 101 and 301 are representative of typical "tip/ring," or local loop, access provided by telephone network 200. Either modem 100 or modem 300 can place a telephone call to each other by going "off-hook" and following standard dialing procedures. However, for the purposes of the following description, it is assumed that modem 100 is the originating modem and that modem 300 is the answering modem.

It is assumed that modem 300 is identical in design to modem 100. The latter comprises CPU 110, memory 120, digital signal processor (DSP) 130, hybrid circuit 140, off-hook relay 160, data terminal equipment interface 170, and hybrid circuit 180. CPU 110 is a microprocessor-based central processing unit, which operates on, or executes, program data stored in memory 120, via path 113. Memory 120 comprises a number of representative storage locations, of which a subset is shown in FIG. 1. Also, it is assumed that hybrids 140 and 180 are not only 2-to-4 wire converters but also include other well-known processing circuitry like analog-to digital converters and digital-to-analog converters for processing an incoming or outgoing signal. Finally, each path, e.g., DSP status information path 131, is representative of a signal path, e.g., a single wire, a data bus etc.

Both modems 100 and 300 are connected to data terminal equipment DTE 50 and DTE 450 via interfaces 51 and 451, respectively. Normally, information is communicated between DTE 50 and DTE 450 by the transmission of a data signal in both directions vis-a-vis modem 100 and modem 300 over leased line 102. As used herein, it is assumed that the term "received data signal" refers to the data signal transmitted by modem 300 and received by modem 100, and the term "transmitted data signal" refers to the data signal transmitted by modem 100 and received by modem 300.

When communicating over leased line 102, hybrid 180 of modem 100 provides the received data signal, RX1 to DSP 130 via path 181. DSP 130, under the control of CPU 110, not only provides a demodulated form of the received data signal to DTE 50 via data terminal equipment interface 170 but also performs an error analysis of this received data signal in order to determine the line quality of leased line 102. For example, signal to noise ratio (SNR), envelope delay, etc. are calculated by DSP 130 and results of any analysis are available to CPU 110 via DSP status information path 131. When the line quality of leased line 102 deteriorates, it generally has a direct affect on the error rate of the data signal communicated over the leased line in either direction. Since modem 100 is the originating modem, it is assumed that the modem 300, the answering modem, does not perform any analysis of the transmitted data signal. When modem 100 detects an error rate of the received data signal above a predetermined threshold, modem 100, as known in the prior art, switches communications from leased line 102 to a dial-up line by stopping transmission over leased line 102 and placing a telephone call to modem 300 through telephone network 200.

Specifically, CPU 110 of modem 100 initiates a telephone call to modem 300 by enabling, via off-hook relay control path 112, off-hook relay 160, which provides an off-hook signal to telephone network 200 to indicate that modem 100 is ready to make a telephone call. In addition, CPU 110 sends information to DSP 130, via control information path 111, to initiate the telephone call. The information passed to DSP 130 includes a telephone number associated with modem 300. This telephone number is converted by DSP 130 into a series of touch-tones, or dial pulses, and applied to hybrid 140 for transmission, through off-hook relay 160, to telephone network 200 via telephone line 101. CPU 110 then sends information to DSP 130, via control information path 111, to perform a data call establishment process with modem 300. This call establishment process typically conforms to a standard, e.g., CCITT V.32., which includes modem handshaking and training. After the data connection is established over the secondary communications channel, any information to, or from, DTE 50 via data terminal interface 170 and DSP 130 is communicated to the secondary channel via hybrid 140 and off-hook relay 160. In particular, the received data signal is provided on path 141 as signal RX2 while the data signal to be transmitted is provided on path 132 as signal TX2. Information is no longer exchanged over the primary channel.

As mentioned above, it is typically not advantageous to communicate information between DTE 50 and DTE 450 over the secondary channel for an extended period of time. Consequently, modem 100 performs an evaluation of the primary channel in order to determine its line quality, or condition, so that data communications can be restored over the primary channel. In particular, and in accordance with the principles of this invention, modem 100 utilizes an existing data signal to monitor or evaluate the primary channel.

Figure 2:
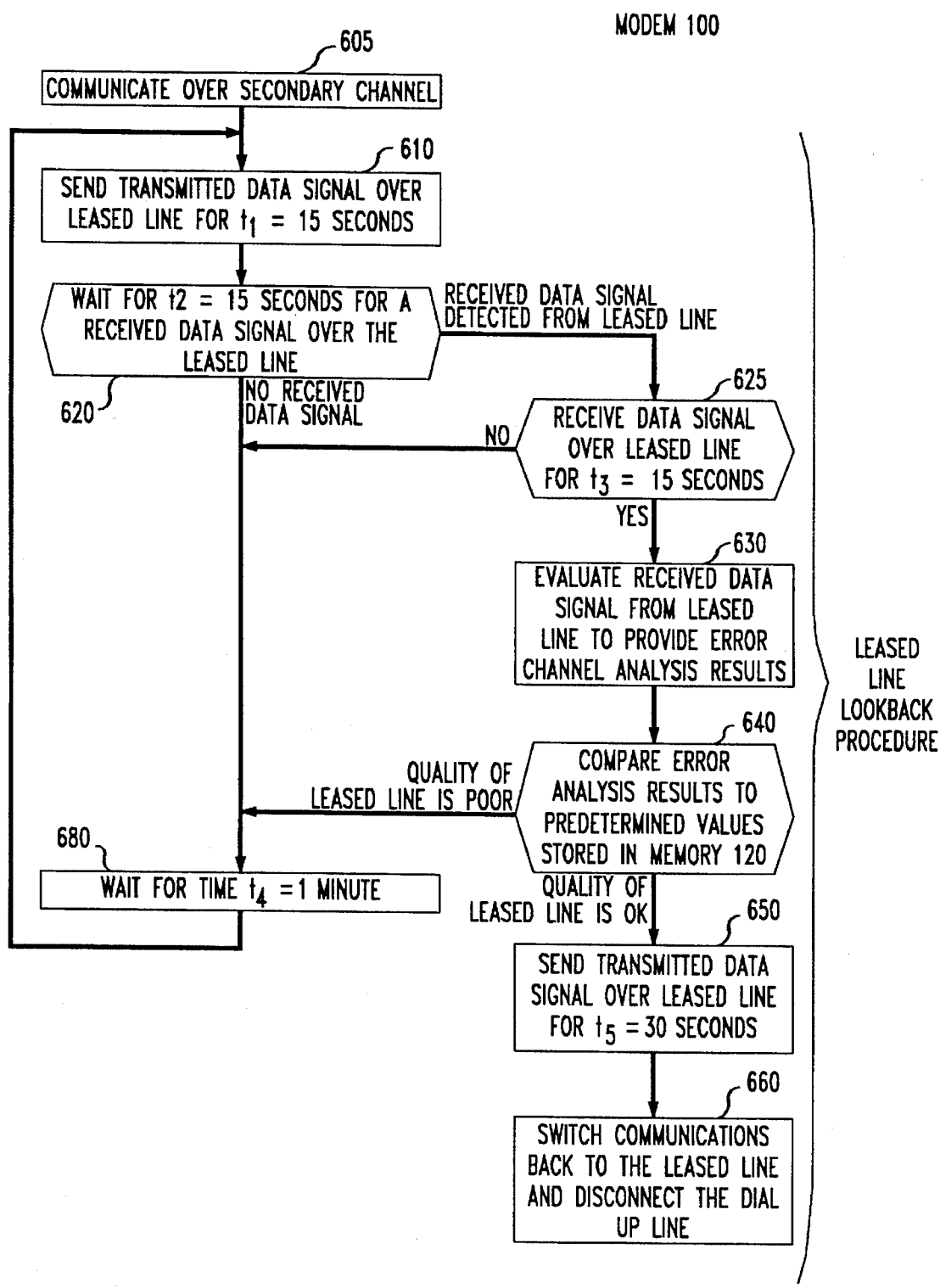
FIG. 2 is a flow diagram of a method embodying the principles of the invention that is used in modem 100 of FIG. 1.

A representative method for monitoring or evaluating the primary channel in accordance with the principles of the invention is shown in FIG. 2 for modem 100. As noted above, and shown in step 605 of FIG. 2, modem 100 is already communicating over the secondary channel, i.e., information is being exchanged between DTE 50 and DTE 450. After communications over the secondary channel is established, CPU 110 enters a "leased line lookback" procedure in step 610. In particular, CPU 110 instructs DSP 130 via control information path 111 to send the data signal to be transmitted not only over the secondary channel but also over the primary channel for a period of time, $t_1$, which is illustratively equal to 15 seconds. As a result, the information provided by DTE 50 is modulated by DSP 130 and simultaneously provided to both hybrid 140 and hybrid 180 via signals TX2 and TX1, respectively. Hybrid 140 applies TX2 to off-hook relay 160 for transmission to modem 300. Similarly, hybrid 180 applies TX1 to leased line 102 for transmission to modem 300. After this simultaneous transmission of TX1 and TX2 over both the primary and secondary channels for time period $t_1$, CPU 110 waits for a response from modem 300 in step 620. In particular, CPU 110 waits for DSP 130 to signal it, via DSP status information path 131, that a received data signal, RX1, has been received over the primary channel. The period of time that CPU 110 waits for this received data signal is $t_2$, which is illustratively equal to 15 seconds.

If after the end of 15 seconds no received data signal has been received over the primary channel, CPU 110 goes to step 680, where CPU 110 sets an interrupt for a predetermined period of time $t_4$, which is illustratively equal to 1 minute. After the period of time $t_4$ passes, CPU 110 attempts again, in step 610, to test the primary channel. In other words, modem 100 continues to exchange information over the secondary channel.

On the other hand, if CPU 110 is signaled by DSP 130 that the received data signal, RX1, has been detected, CPU 110 goes to step 625. In this step, CPU 110 determines if the received data signal is detected on leased line 102 for at least a period of time $t_3$, which is illustratively equal to 15 seconds. If the received data signal is not detected for at least this time period, $t_3$, then CPU 110 goes to step 680 described above. However, if the received data signal is detected for at least this time period, $t_3$, then in step 630 DSP 130 performs an error analysis of the received data signal, RX1, e.g., DSP 130 computes an SNR value for the received data signal, RX1. In step 640, this SNR value is provided to CPU 110 via DSP status information path 131, and CPU 110 compares this SNR value for the received data signal RX1 to a predetermined SNR value stored in memory 120. If the SNR value for the received data signal RX1 is less than the predetermined value stored in memory, than CPU 110 goes to step 680, as described above. In other words, the line quality of the leased line is still "poor" and information continues to be transmitted over the secondary channel. On the other hand, if the SNR value for the received data signal RX1 is greater than or equal to the predetermined value, then it is assumed that the line quality of the leased line is "OK." As a result, CPU 110 goes to step 650, in which CPU 110 instructs DSP 130, via control information path 111, to again simultaneously send the data signal to be transmitted over both the primary and secondary channel for a period of time $t_5$, which is illustratively equal to 30 seconds. Then, in step 660, CPU 110 instructs DSP 130, via control information path 111, to switch communications back to the primary channel, i.e., leased line 102. In addition, CPU 110 sends a control signal to off-hook relay 160 to disconnect the dial-up line, i.e., to hang-up. This second simultaneous communication over both the primary and the secondary channels provides a confirmation to modem 300 that communications is going to be switched back to the primary channel and the secondary channel is going to be disconnected.

Figure 3:
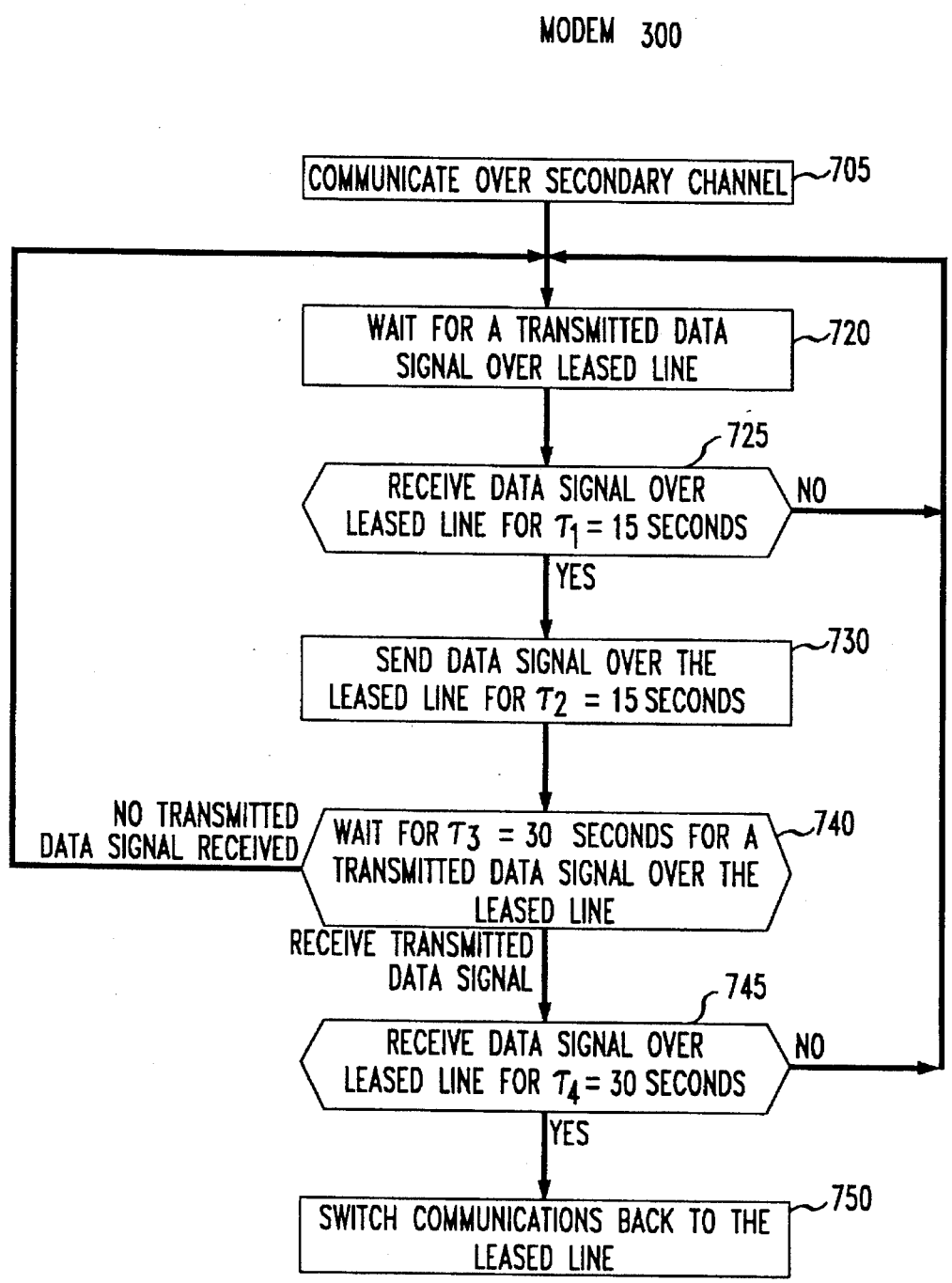
FIG. 3 is a flow diagram of a method embodying the principles of the invention that is used in modem 300 of FIG. 1.

A complementary method, in accordance with the principles of this invention, is shown in FIG. 3 for modem 300. The steps shown in FIG. 3 are similar to those described above for FIG. 2, except that after modem 300 establishes communications over the secondary channel in step 705, modem 300 waits for a transmitted data signal over the primary channel in step 720. When a transmitted data signal is finally received by modem 300 over leased line 102, modem 300 performs step 725. In this step, modem 300 determines if the transmitted data signal is detected on leased line 102 for at least a period of time $\tau_1$, which is illustratively equal to 15 seconds. If the transmitted data signal is not detected for at least this time period, $\tau_1$, then modem 300 goes to back to step 720 described above. However, if the transmitted data signal is detected for at least this time period, $\tau_1$, then in step 730, which is similar to step 610 of FIG. 2, modem 300 simultaneously transmits its data signal on both the primary and secondary channels for a time period, $\tau_2$, which is illustratively equal to 15 seconds. After the time period $\tau_2$ passes, modem 300 waits for a response, i.e., another transmitted data signal, from modem 100 in step 740. The period of time that modem 300 waits for a response is $\tau_3$, which is illustratively equal to 15 seconds.

If, after the end of 15 seconds, no transmitted data signal has been received over the primary channel, modem 300 goes back to step 720 and waits to start the process over. However, if a transmitted data signal from modem 100 is received within this time period $\tau_3$, then modem 300 goes to in step 745. In this step, modem 300 determines if the transmitted data signal is detected on leased line 102 for at least a period of time $\tau_4$, which is illustratively equal to 30 seconds. If the transmitted data signal is not detected for at least this time period, $\tau_4$, then modem 300 goes to back to step 720 described above. However, if the transmitted data signal is detected for at least this time period, $\tau_4$, then in step 750, modem 300 restores communications back to the primary channel.

As can be observed from the above description, any data communications equipment can evaluate the primary channel in accordance with the principles of this invention. In addition, the use of the existing data signal to test the primary channel's effect on signal quality across the entire spectrum of the data signal allows the data communications equipment to perform a simpler or more complete analysis of the received data signal so that a premature transition back to the leased line does not occur. For example, although an SNR computation was illustratively used for evaluating the affect of the leased line on the received data signal, the data communications equipment may simply detect energy from the received data signal, or it may perform a sophisticated analysis of the delay characteristics of the received data signal.

The foregoing merely illustrates the principles of the invention and it will thus be appreciated that those skilled in the art will be able to devise numerous alternative arrangements which, although not explicitly described herein, embody the principles of the invention and are within its spirit and scope.

We claim:

1. A method for use in data communications equipment comprising the steps of:

establishing a data connection to a remote data communications equipment over a first communications channel;

providing a first data signal to the remote data communications equipment over the first communications channel;

receiving a second data signal from the remote data communications equipment over the first communications channel;

determining an error rate of the received second data signal over the first communications channel;

establishing a data connection to the remote data communications equipment over a second communications channel as a function of the error rate;

providing the first data signal to the remote data communications equipment over the second communications channel; and disconnecting the second communications channel as a function of the error rate.

2. The method of claim 1 wherein the determining an error rate step includes the steps of:

detecting an energy level of the received second data signal; and determining the error rate as a function of the detected energy level.

3. The method of claim 1 wherein the determining an error rate step includes the steps of:

determining a signal quality of the received second data signal; and determining the error rate as a function of the determined signal quality, 4. A method for use in data communications equipment for restoring communications over a primary communication channel after switching communications to a secondary communications channel, the method comprising the steps of:

exchanging information over the secondary communications channel by providing a first data signal to a remote data communications equipment and receiving a second data signal from the remote data communications equipment;

periodically exchanging a portion of the first data signal and a portion of the second data signal over the primary communications channel;

during the periodic exchange, determining a line quality of the primary channel; and terminating the communications over the secondary channel as a function of the determined line quality of the primary channel.

5. The method of claim 4 wherein the determining step includes the steps of:
   detecting an energy level of the received portion of the second data signal over the primary communications channel; and
   determining the line quality from the detected energy level.

6. The method of claim 4 further including the step of restoring communications over the primary communications channel when the determined line quality is above a predetermined level.

7. A method for use in data communications equipment for restoring communications over a primary communication channel after switching communications to a secondary communications channel, the method comprising the steps of:
   exchanging information over the secondary communications channel by providing a first data signal to a remote data communications equipment and receiving a second data signal from the remote data communications equipment;
   sending for a period of time, $t_1$, the first data signal over the primary communications channel to the remote data communications equipment;
   receiving for a period of time, $t_1$, the second data signal over the primary communications channel from the remote data communications equipment;
   determining a line quality over the time period, $t_1$, of the received second data signal over the primary communications channel;
   terminating communications over the secondary channel as a function of the determined line quality.

8. The method of claim 7 wherein the determining step includes the steps of:
   detecting an energy level of the received second data signal over the primary communications channel; and
   determining the line quality from the detected energy level.

9. The method of claim 7 further including the step of restoring communications over the primary communications channel when the determined line quality is above a predetermined level.

10. Data communications equipment apparatus comprising:
    means for receiving a data source signal from a data source;
    means for modulating the received data source signal to provide a modulated data signal;
    a first port for coupling to a first communications channel;
    a second port for coupling to a second communications channel;
    means for determining an error rate of a received data signal provided by the first port, the received data signal being transmitted from a remote data communications equipment apparatus that is coupled to both the first communications channel and the second communications channel; and
    means for simultaneously providing the modulated data signal to the first port and the second port for transmission over the respective communications channels to the remote data communications equipment apparatus so long as the determined error rate is below a predetermined value.

11. Data communications equipment apparatus comprising:
    means for receiving a data source signal from a data source;
    means for modulating the received data source signal to provide a modulated data signal;
    a first port for coupling to a first communications channel;
    a second port for coupling to a second communications channel;
    means for determining an error rate of a received data signal provided by the first port, the received data signal being transmitted from a remote data communications equipment apparatus that is coupled to both the first communications channel and the second communications channel; and
    means for simultaneously providing for a period of time T the modulated data signal to the first port and the second port for transmission over the respective communications channels to the remote data communications equipment apparatus so long as the determined error rate is below a predetermined value.

* * * * *